United States Patent
Olaya et al.

(10) Patent No.: US 12,554,271 B2
(45) Date of Patent: Feb. 17, 2026

(54) VALVE ACTUATION CONTROL

(71) Applicant: Dresser, LLC, Houston, TX (US)

(72) Inventors: Mickael Olaya, Valdallière (FR); Valentin Mercier, Flers (FR); Romain Chenu, Condé-sur-Noireau (FR); Aurelien Reau, Flers (FR); Arnaud Riviere, Couvains (FR)

(73) Assignee: Dresser, LLC, Houston, TX (US)

( * ) Notice: Subject to any disclaimer, the term of this patent is extended or adjusted under 35 U.S.C. 154(b) by 511 days.

(21) Appl. No.: 18/090,832

(22) Filed: Dec. 29, 2022

(65) Prior Publication Data

US 2024/0219934 A1 Jul. 4, 2024

(51) Int. Cl.
*G05D 7/06* (2006.01)
*G05B 15/02* (2006.01)

(52) U.S. Cl.
CPC .......... *G05D 7/0623* (2013.01); *G05B 15/02* (2013.01); *G05D 7/0635* (2013.01)

(58) Field of Classification Search
CPC .... G05D 7/0623; G05D 7/0635; G05B 15/02; F16K 37/0041; F16K 37/00; F16K 37/0033
See application file for complete search history.

(56) References Cited

U.S. PATENT DOCUMENTS

| | | | | |
|---|---|---|---|---|
| 2,568,574 | A * | 9/1951 | Charles | G05D 23/128 236/99 R |
| 5,616,829 | A * | 4/1997 | Balaschak | G01M 3/184 251/20 |
| 2014/0097367 | A1* | 4/2014 | Burt | F24F 11/89 251/129.04 |
| 2014/0305525 | A1* | 10/2014 | Le Moing | F16K 37/0083 137/553 |
| 2018/0091017 | A1* | 3/2018 | Driker | H02K 7/003 |
| 2020/0378526 | A1* | 12/2020 | Nelson | F16K 31/535 |
| 2021/0123543 | A1* | 4/2021 | Inoue | G05B 23/0283 |
| 2022/0178466 | A1* | 6/2022 | Dyrdal | F16K 37/0041 |

FOREIGN PATENT DOCUMENTS

WO WO-2016175800 A1 * 11/2016

* cited by examiner

*Primary Examiner* — Alicia M. Choi
(74) *Attorney, Agent, or Firm* — Mintz, Levin, Cohn, Ferris, Glovsky and Popeo, P.C.

(57) ABSTRACT

Systems, devices, and methods of controlling valve actuation using an inertial sensor are provided. The system can include a valve including an inlet, an outlet, and a plug positioned between the inlet and the outlet. The plug can include a stem configured to translate or rotate in a first direction causing the plug to open the valve or to translate or rotate in a second direction causing the plug to close the valve. The system can also include an actuator coupled to the stem, an inertial sensor coupled to the stem, and a controller coupled to the inertial sensor and to the actuator. The controller can cause the controller to receive sensor data from the inertial sensor and to generate control signals provided to the actuator. The control signals can cause the actuator to translate or rotate the stem in the first direction or the second direction.

18 Claims, 5 Drawing Sheets

VALVE ACTUATION CONTROL

BACKGROUND

Valves are mechanical devices which are commonly used with fluid processing pipelines and fluid storage vessels, such as in power generation, refining or oil and gas production environments, for controlling flow of a fluid passing through the valve. A variety of non-limiting valve types can be used in these environments.

Valve actuation control can be provided by control systems, such as controllers, configured to adjust and thereby control rotation or movement valve components in order to control flow of a fluid passing through the valve. Precise actuation of valves can be required for various processing applications and can require corresponding controllers configured to provide accurate control signals for satisfactorily operating the valve as needed. There exists a need for improved control systems which can implement control feedback loops to satisfy precision valve actuation in a variety of processing environments and valve types.

SUMMARY

In general, systems, apparatuses, and methods for controlling valve actuation using an inertial sensor are provided.

In one aspect, a system is provided. In one embodiment, the system can include a valve having an inlet, an outlet, and a plug positioned between the inlet and the outlet. The plug can be coupled to a stem configured to translate or rotate in a first direction causing the plug to open the valve and to translate or rotate in a second direction opposite to the first direction to cause the plug to close the valve. The system can also include an actuator coupled to the stem and an inertial sensor coupled to the stem. The system can further include a controller coupled to the inertial sensor and to the actuator. The controller can include at least one data processor and a memory storing non-transitory, computer-readable instructions, which when executed by the at least one data processor can cause the controller to receive sensor data from the inertial sensor and to generate control signals provided to the actuator, the control signals causing the actuator to translate or rotate the stem in the first direction or the second direction.

In another aspect a method is provided. In one embodiment, the method can include receiving, by at least one data processor of a controller, sensor data from an inertial sensor coupled to a stem of a valve. The valve can include an inlet, an outlet, and a plug positioned between the inlet and the outlet. The stem can be configured to translate or rotate in a first direction causing the plug to open the valve or to translate or rotate in a second direction opposite to the first direction causing the plug to close the valve. The method can also include determining, by the at least one data processor of the controller based on the received sensor data, at least one control signal configured to cause an actuator coupled to the stem to translate or rotate the stem in the first direction or the second direction. The method can further include providing, by the at least one data processor and based on the determining, the at least one the control signal to the actuator. The method can also include opening or closing the valve based on the at least one control signal.

In some embodiments, the actuator can include a pneumatic actuator, a mechanical actuator, or an electric-drive actuator. In some embodiments, the inertial sensor can include at least one accelerometer and at least one gyroscope. In some embodiments, the sensor data can correspond to translation or rotation of the stem in the first direction or the second direction and can include velocity data, vibration data, packing friction data, and multi-axis position data. In some embodiments, the multi-axis position data can include acceleration data and rotational speed data corresponding to the rotation or translation of the stem in the first direction or the second direction. In some embodiments, the acceleration data and the rotational speed data can be associated with rotation or translation of the stem along an X-axis, a Y-axis, and/or a Z-axis of the stem.

In some embodiments, the system can include a temperature sensor coupled to the stem and to the controller. The sensor data can include temperature data associated with the stem. In some embodiments, the memory can be configured to store one or more valve characteristics comprising a rotation zero value corresponding to a position of the stem. In some embodiments, the controller can be configured to generate the control signals based on comparing the sensor data to the rotation zero value. In some embodiments, the system can include a power supply coupled to the actuator and the inertial sensor.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Valve actuation control can require precision control in order to provide accurate, small-scale adjustments to a valve through which a fluid may pass. Typically a valve stem can be coupled to a valve plug such that movement of the valve stem causes the valve plug to move in relation to an inlet and/or an outlet of the valve. The valve stem can be coupled to an actuator configured to move the valve stem in a first direction, such as a direction associated with opening the valve, and a second direction, such as a direction associated with closing the valve.

The actuator can be communicatively coupled to a control system, which can be configured to generate control signals to be provided to the actuator to cause the actuator to move the valve stem in the first direction and/or the second direction. Traditionally, the control system can be configured to receive sensor data from a sensor that requires a mechanical linkage to the valve stem, such as a Hall-effect sensor. The use of such sensors and mechanical linkages can create limitations for valve actuation control systems such as a large number of mechanical parts necessary for configure the mechanical linkage, and complex assembly designs of the mechanical linkages, which can make repair of the valve, the actuator, or controller costly in terms of equipment, down-time, and human resources. Additionally, these complex mechanical linkages of traditional control systems can introduce slack or play in the linkage connections over time which can reduce the accuracy of the control system and the valve being actuated by the control system. Further, the use of mechanical linkages can create interference between two or more components of the linkage and can reduce the modularity of the control system. For example, the mechanical linkages are often highly specialized in regard to a particular valve (e.g., a particular valve stroke parameter) or a particular control system (e.g., an actuator size) and may not be easily adaptable for other valves or control systems. These limitations can be addressed with the improved valve actuation control system described herein.

An improved valve actuation control system, as described herein, includes an inertial sensor that can be coupled to a valve component, such as a valve stem. The inertial sensor can be communicatively coupled to a controller and can provide sensor data corresponding to movement and temperature of the valve stem to the control system. The inertial sensor can address the aforementioned limitations of traditional control systems by replacing the complex mechanical linkages with an electrical connection requiring only a small number of wires to couple the inertial sensor to a controller. The improved valve actuation control system described herein can significantly reduce the number of parts required to mount the sensor to the valve. The inertial sensor can be provided as a microelectromechanical system (MEMS) which can reduce the overall footprint of the system and reduce the play or variability that can be introduced by mechanical linkages. As a result, the improved valve actuation control system described herein can reduce the cost of assembly and maintenance of the valve and controller and reduce or even eliminate human errors in assembly, calibration, or maintenance compared to traditional valve actuation control systems employing complex mechanical linkages for controlling valve actuation. Thus, the improved valve actuation control system described herein can provide a smaller footprint, simplified coupling to valve components, and can allow a more precise closed-loop control environment in a wide variety of valve control applications.

Figure 1:
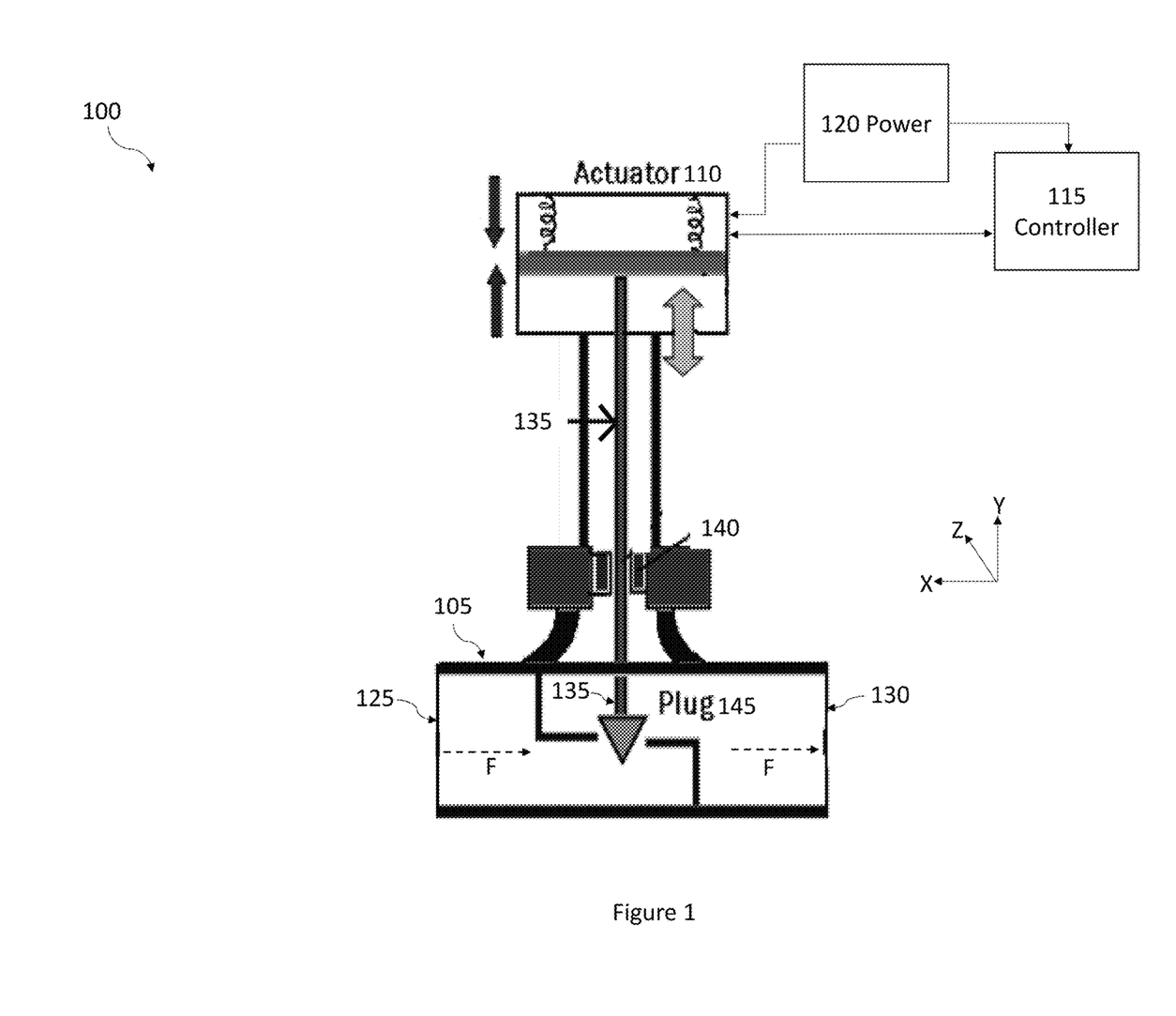
FIG. 1 is a diagram illustrating an embodiment of a system for controlling valve actuation using an inertial sensor according to subject matter described herein.

The improved valve actuation control system 100 shown in FIG. 1, can include a valve 105 and an actuator 110 mechanically coupled to the valve 105. The system 100 can also include an inertial sensor controller 115 communicably coupled to the actuator 110 and a power supply 120 communicably coupled to the inertial sensor controller 115 and to the actuator 110. In some embodiments, the power supply 120 can be configured within or provided by the inertial sensor controller 115.

The valve 105 can include a non-limiting variety of valves, such as a rotary valve, a globe valve, a butterfly valve, a ball valve, a gate valve, or the like. The valve 105 can include an inlet 125 at which a fluid enters the valve 105 and an outlet 130 at which the fluid exits the valve 105. The fluid can flow along a flow path F between the inlet 125 and the outlet 130. The valve 105 can be configured to control the fluid flowing through the valve 105 by virtue of the actuator 110 acting to open or close the valve 105. The controller 115 can generate and provide control signals to the actuator 110, which can cause the actuator 110 to actuate a portion of the valve, such as a valve stem, in order to open or close the valve. The actuator 110 can be an electromechanical component including a motor, for example, coupled to a valve stem 135 of the valve 105. In some embodiments, the actuator 110 can include a pneumatic actuator or a hydraulic actuator. One or more sensors 140 can be coupled to or provided adjacent to the valve stem 135. Actuation of the actuator or motor can cause the valve stem 135 to translate so that the plug 145 of the valve 105 opens or closes the valve. In some embodiments, actuation of actuator 110 or motor can cause the valve stem 135 to rotate to open or close the valve 105. A variety of non-limiting valves 105 and valve stem 135 configurations can be included in the system 100 without deviating from the subject matter described herein. In some embodiments, the flow path F, the inlet 125, and the outlet 130 can be arranged opposite to that shown in the valve 105 of FIG. 1.

Figure 2:
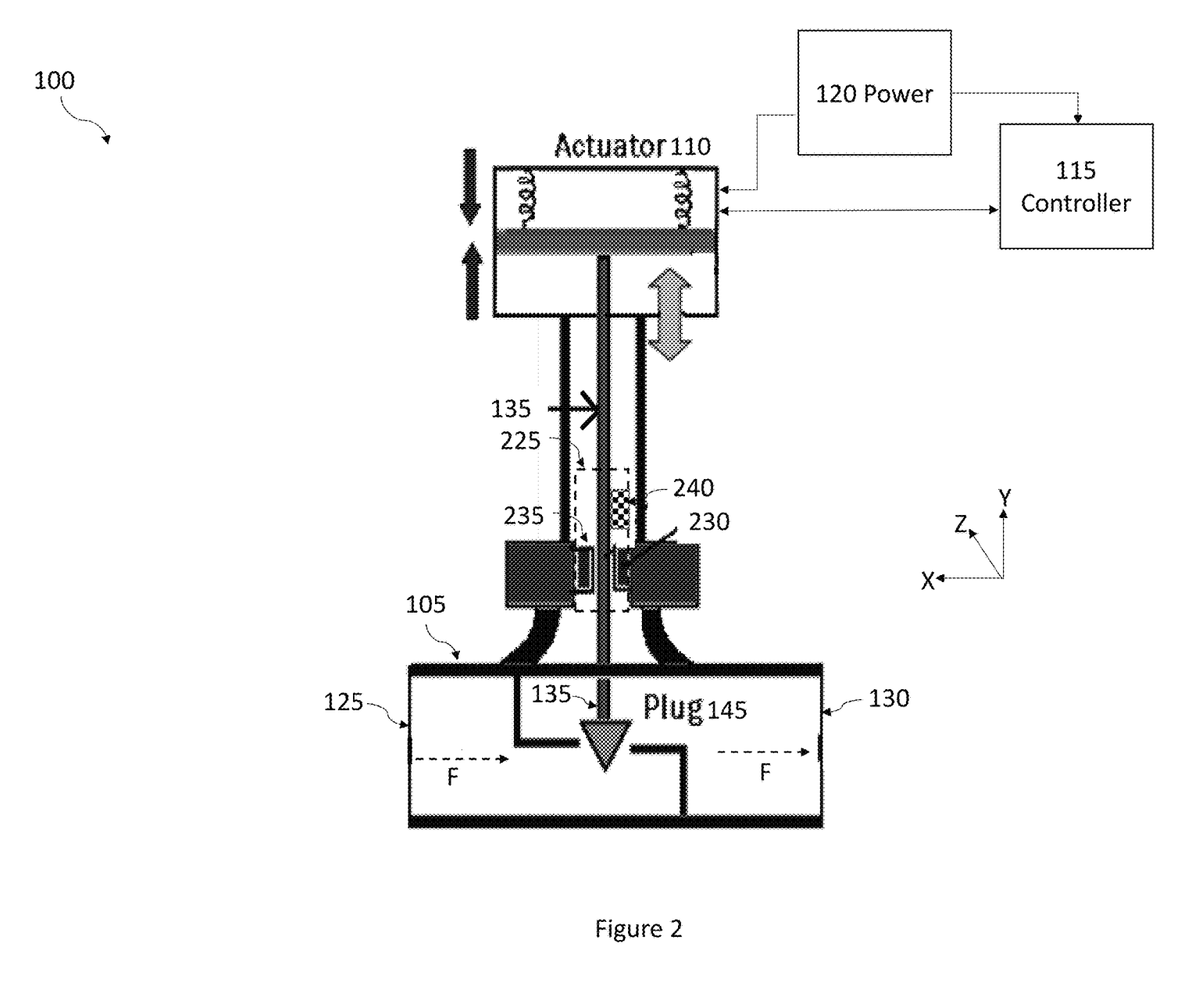
FIG. 2 is a diagram of a portion of the system of FIG. 1.

As shown in FIG. 2, the actuator 110 can be coupled to the inertial sensor controller 115. The inertial sensor controller 115 can generate and provide control signals to the actuator 110. The valve stem 135 can mechanically couple the actuator 110 to the valve 105. The valve stem 135 can be coupled to the valve plug 145 which can be provided between the inlet 125 and the outlet 130 of the valve 105. Rotation or translation of the valve stem 135 can cause rotation or movement (e.g., translation) of the valve plug 145 to control the fluid flow through the valve 105. In some embodiments, the actuator 110 can be a pneumatic actuator, a mechanical actuator, or an electric-drive actuator.

The one or more sensors 140 of the valve actuation control system 100 shown in FIG. 1 can include an inertial sensor 225 as shown in FIG. 2. An inertial sensor can measure acceleration and angular velocity of an object along three mutually perpendicular axes (e.g., an "x", "y", or "z" axis). In some embodiments, the inertial sensor 225 can be an inertial measurement unit (IMU) and can include a MEMS sensor. The inertial sensor 225 can include one or more of an accelerometer 230, a gyroscope 235, and/or a temperature sensor 240. The inertial sensor 225 can be positioned in contact with the valve stem 135 and can be configured to determine and generate sensor data corresponding to translation or rotation and temperature of the valve stem 135. For example, the sensor data can include velocity data, vibration data, packing friction data, and position data, such as multi-axis position data. For example, the multi-axis position data can include acceleration data and rotational speed data associated with translation or rotation of the valve stem 135 along an of the X-axis, Y-axis, or Z-axis. The sensor data generated by the inertial sensor 225 can correspond to movement of the valve stem 135 in regard to a first direction that can open the valve 105 or a second direction that can close the valve 105. The second direction can be opposite to the first direction. The inertial sensor 225 can also include a temperature sensor 240 that can generate temperature data associated with the valve stem 135. Translation or rotation of the valve stem 135 along the Y-axis in a first direction can cause the valve plug 145 to translate or rotate so as to open the valve 105. Translation or rotation of the valve stem 135 along the Y-axis in a second direction can cause the valve plug 145 to translate or rotate so as to close the valve 105. The first direction can opposite to the second direction.

The system 100 can include an inertial sensor controller 115 configured as a computing device or computing system as described herein. The inertial sensor controller 115 can include a computing architecture shown in FIG. 3. For example, the power supply 120 can provide power to the inertial sensor controller 115, the inertial sensor 225, and/or the actuator 110. Although a single power supply 120 is shown, it will be appreciated that multiple power supplies can be envisioned without limit. The inertial sensor 225 can be positioned in contact or adjacent to the valve stem 135, such that components of the inertial sensor 225 can sense physical attributes associated with translation and rotation of the valve stem 135 and generate sensor data that can be provided to the inertial sensor controller 115. The sensor data can also include a clock signal received form the inertial sensor 225, which can be used to synchronize other sensor data values temporally. For example, the accelerometer 230, the gyroscope 235, and/or the temperature sensor 240 can generate sensor data that can be received by an interpreter 315 of the inertial sensor controller 115. In some embodiments, the interpreter 315 can be a rotational interpreter or an axial interpreter. The interpreter 315 can include logic and/or executable computer readable functionality that when executed by a data processor of the controller causes the inertial sensor controller 115 to determine sensor data values that correspond to each of the X, Y, and Z-axes that the inertial sensor 225 translates or rotates along (and thus also corresponding to translation or rotation of the valve stem 135 with respect to its X, Y, and Z-axes). For example, acceleration and rotational speed data values can be determined with respect to each of the X, Y, and Z-axes based on the sensor data received from the accelerometer 230, and the gyroscope 235, respectively.

Figure 3:
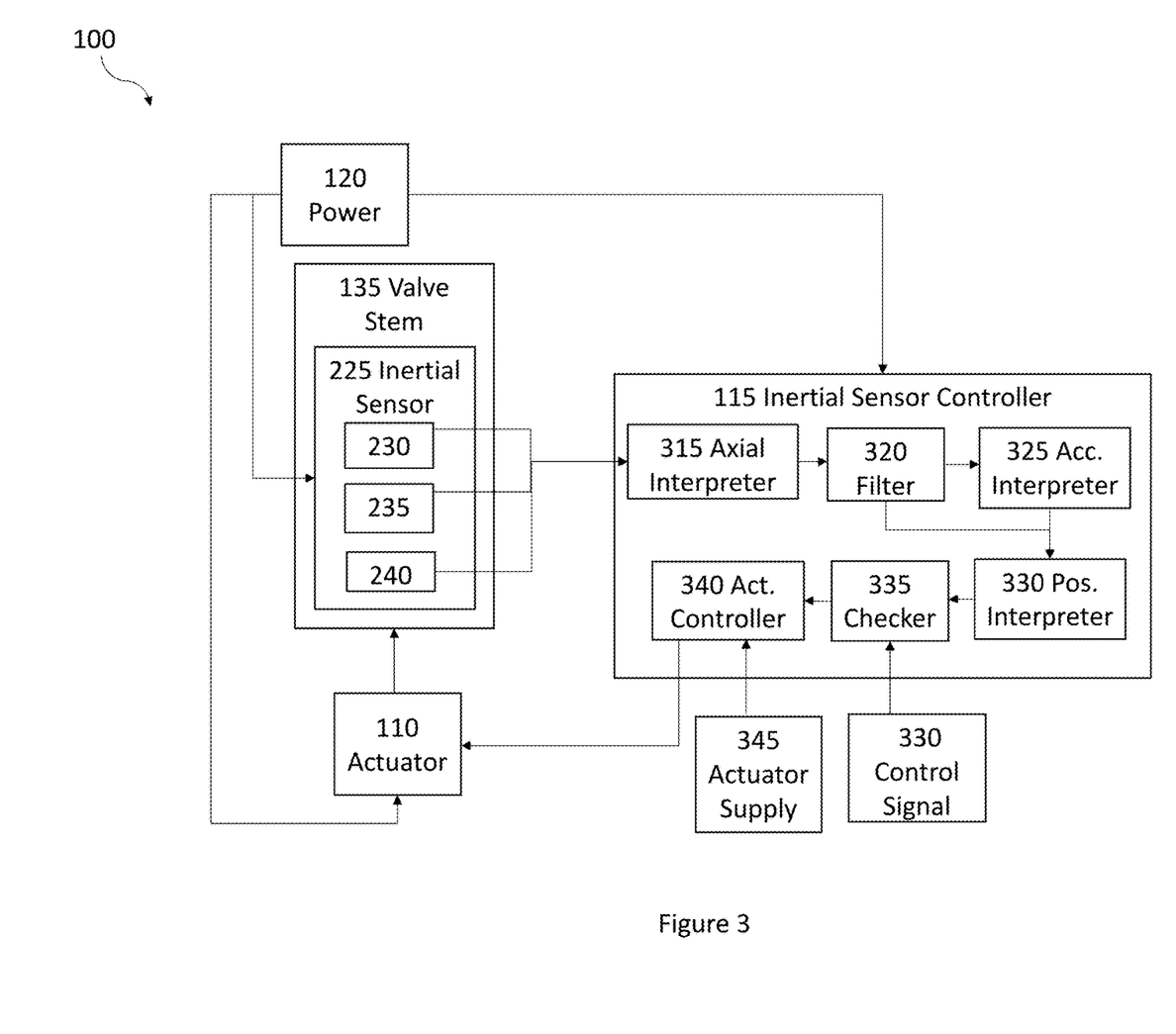
FIG. 3 is a diagram illustrating an embodiment of a computing architecture of the system of FIG. 1 according to subject matter described herein.

Additionally, the interpreter 315 can also process the temperature data received from the temperature sensor 240 and use the temperature data to correct the raw sensor data values received from the accelerometer 230, and the gyroscope 235, e.g., to correct the axial acceleration data and the rotational speed data.

The corrected sensor data can be provided from the interpreter 315 to a filter 320. In some embodiments, the filter 320 can include a Kalman filter.

The filtered sensor data can be received by an acceleration interpreter 325 (e.g., "Acc. Interpreter") and a position interpreter 330 (e.g., "Pos. Interpreter"). For example, the filtered sensor data associated with acceleration of the inertial sensor 225 along the X, Y, and Z axes can be received and further processed. Acceleration data associated with the X-axis can be integrated to determine a velocity of the inertial sensor 225 (and thus the valve stem 135). Acceleration data associated with the Y axis can be fused via a first fusion algorithm with the velocity corresponding to the acceleration data associated with the X axis and the fused data can be stored. Acceleration data and vibration data can be stored in memory and used for maintenance diagnostics and/or repair of the system 100.

The filtered sensor data can also be received by a position interpreter 330 (e.g., Pos. Interpreter"). For example, the filtered sensor data associated with the rotational speed of the inertial sensor 225 along the X, Y, and Z axes can be received and further processed. Rotational speed data associated with each of the X, Y, and Z axes can be fused via a second fusion algorithm to determine a position associated with the inertial sensor 225 (and thus the valve stem 135). The second fusion algorithm can also receive acceleration data associated with the Z axis for determination of the position of the inertial sensor 225. The determined position can be provided to the first fusion algorithm. The determined position can correspond to a single axis, such as the X axis, the Y axis, or the Z axis depending on the primary axis by which the valve stem 135 and the inertial sensor 225 rotate. Advantageously, the fusion algorithm can enable determination of position of the valve stem 135 with greater precision than conventional systems. For example, fusing the acceleration data and the vibration data enable more accurate determination of the position of the valve stem 135.

The determined position can be provided to a checker 335 and can be compared to a control signal 330. The control signal can be provided by a user. For example, the control signal can be 4-20 mA. In some embodiments, the control signal can be a numerical signal provided wireless communication protocols such as WiFi or Zigbee. The control signal can be any signal that is different from it's source (e.g., analog or numeric). Based on the comparison, the checker 335 can adjust the determined position according to one or more valve characteristics or parameters stored in a memory of the controller 115. For example, the valve characteristics or parameters can include a valve type, a flow coefficient (CV) of the valve, an opening pressure, a valve stroke, or the like.

The checker 335 can provide a corrected position value to an actuator controller 340 (e.g., Act. Controller). The actuator controller 340 can be a separate or additional controller included in the system 100. In some embodiments, the actuator controller 340 can be included in the inertial sensor controller 115. In some embodiments, the actuator controller 340 can process the corrected position value provided by the checker 335 via a proportional-integral-derivative (PID) controller (or a corrector PID). The corrector PID is a control loop mechanism employing feedback that is widely used in industrial control systems and a variety of other applications requiring continuously modulated control. A PID controller continuously calculates an error value, e(t), as the difference between a desired setpoint (SP) and a measured process variable (PV) and applies a correction based on proportional, integral, and derivative terms (denoted P, I, and D respectively). The corrected position value can be updated via the PID and a converter of the actuator controller 340 to generate a control signal that can be provided to a signal regulator of the actuator controller 340. The signal regulator can also receive an input from an actuator supply 345 and generate a control signal to be provided to the actuator 110. The signal regular can be a relay configured to receive a small input signal and to provide a larger input signal to the actuator 110. In some embodiments, the actuator supply 345 can include a pneumatic supply but other actuator supply configurations can be envisioned. The control signal generated by the actuator controller 340 can cause the actuator 110 to adjust a position of the valve stem 135 so as to control actuation of the valve 110.

Figure 4:
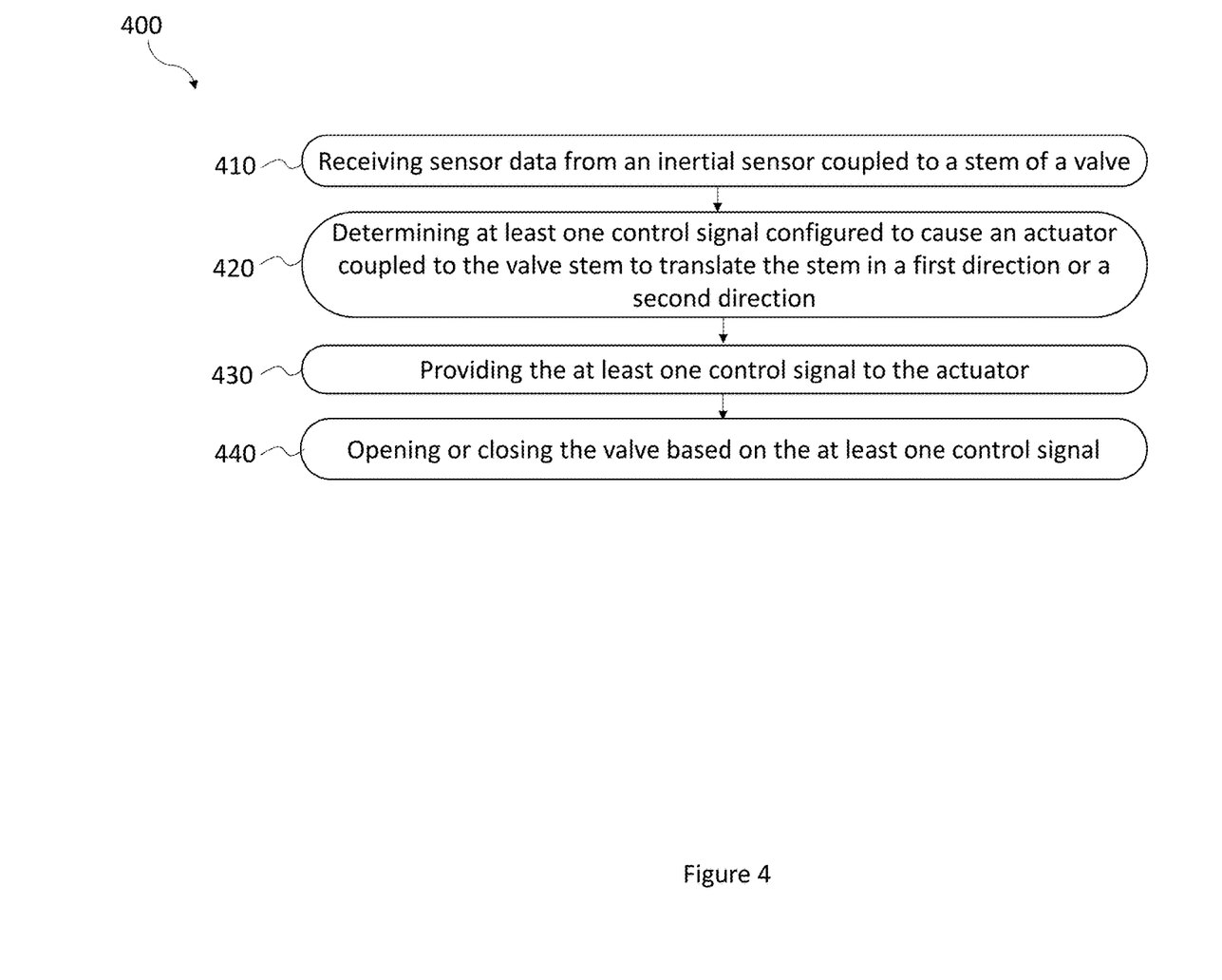
FIG. 4 is a process flow diagram describing a embodiment of a method for controlling valve actuation using the system of FIG. 1 according to subject matter described herein.

The system 100, described herein, can be configured to perform the method 400 illustrated in FIG. 4. For example, at 410, sensor data received from an inertial sensor 225 coupled to a valve stem 135 of a valve 105 can be received by a data processor included in a controller of the system, such as the inertial sensor controller 115.

At 420, a data processor of the inertial sensor controller 115 (and/or a data processor of the actuator controller 340) can determine at least one control signal configured to cause an actuator 110 coupled to the valve stem 135 to rotate the valve stem in a first direction or in a second direction that can be opposite to the first direction.

At 430, the inertial sensor controller 115 can provide the at least one control signal to the actuator 110. As a result, the actuator 110 can be actuated according to the control signal to actuate the valve stem 135 such that the valve 105 is opened or closed based on the at least one control signal at 440.

Figure 5:
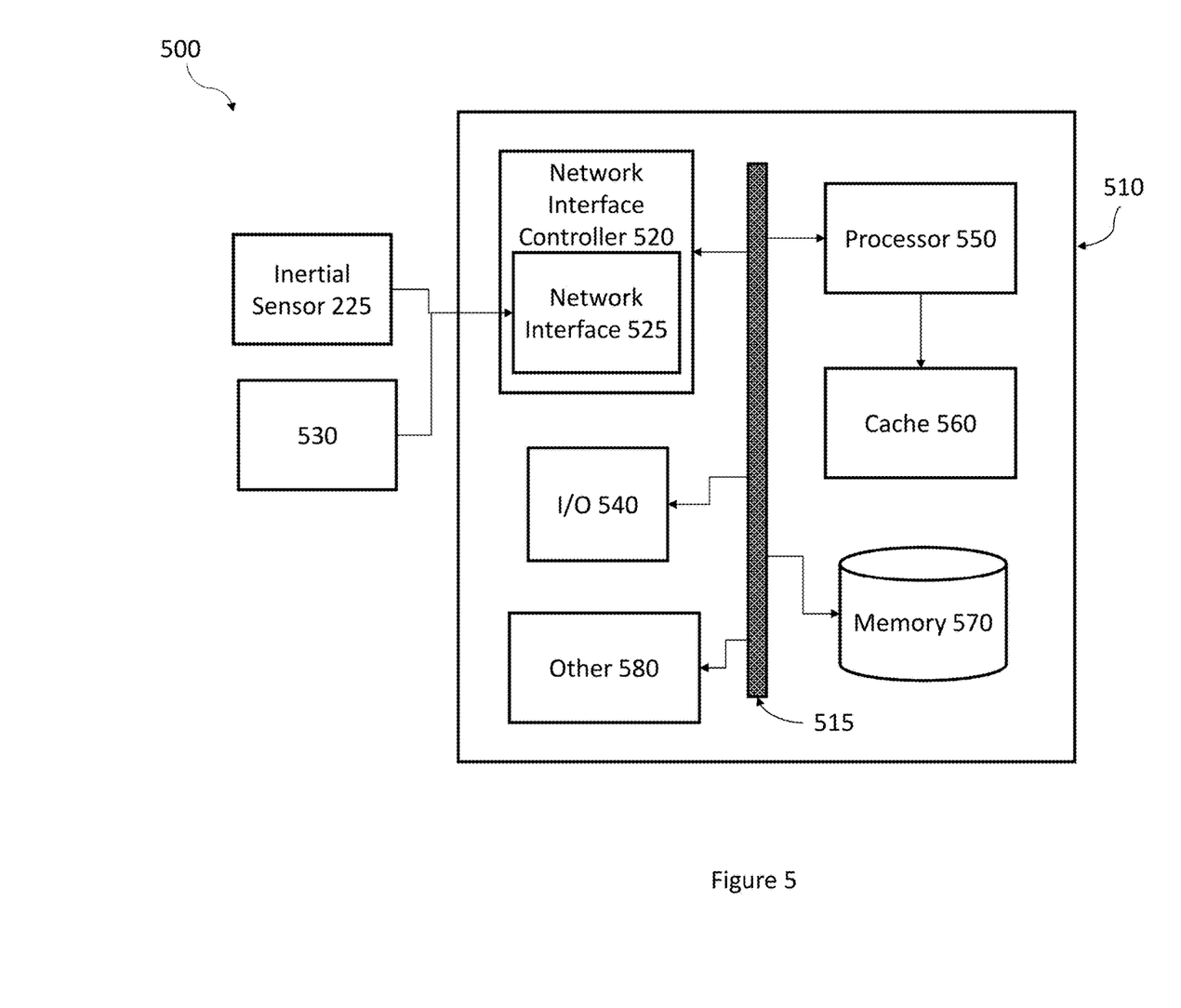
FIG. 5 is a block diagram of an exemplary computing system configured for use in the system of FIG. 1 according to subject matter described herein.

FIG. 5 is a block diagram 500 of a computing system 510, such as an inertial sensor controller 115 configured to control valve actuation via an inertial sensor 225 as shown and described in relation to FIGS. 1-4. In broad overview, the computing system 510 includes at least one processor 550 for performing actions in accordance with instructions, and one or more memory devices 560 and/or 570 for storing instructions and data. The illustrated example computing system 510 includes one or more processors 550 in communication, via a bus 515, with memory 570 and with at least one network interface controller 520 with a network interface 525 for connecting to external device, such as the inertial sensor 205. In some embodiments, the network interface controller 520 and network interface 525 can be communicatively coupled to a second computing device, a network device, a server, or the like. The one or more processors 550 are also in communication, via the bus 515, with each other and with any I/O devices at one or more I/O interfaces 540, and any other devices 580. The processor 550 illustrated incorporates, or is directly connected to, cache memory 560. Generally, a processor will execute instructions received from memory. In some embodiments, the computing system 510 can be configured within a cloud computing environment, a virtual or containerized computing environment, and/or a web-based microservices environment.

In more detail, the processor 550 can be any logic circuitry that processes instructions, e.g., instructions fetched from the memory 570 or cache 560. In many embodiments, the processor 550 is an embedded processor, a microprocessor unit or special purpose processor. The computing system 510 can be based on any processor, e.g., suitable digital signal processor (DSP), or set of processors, capable of operating as described herein. In some embodiments, the processor 550 can be a single core or multi-core processor. In some embodiments, the processor 550 can be composed of multiple processors. For example, in some embodiments, a plurality of processors can be communicatively coupled and configured to accelerate one or more fusion algorithms included in the computing system 510, such as the interpreters 315, 325, 330 described in relation to FIG. 3. In some embodiments, the computing system 510 can include a one or more graphics processing units (GPUs) configured to accelerate one or more fusion algorithms included within the computing system 510. The fusion algorithms can be configured on the one or more GPUs.

The memory 570 can be any device suitable for storing computer readable data. The memory 570 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing system 510 can have any number of memory devices 570.

The cache memory 560 is generally a form of high-speed computer memory placed in close proximity to the processor 550 for fast read/write times. In some implementations, the cache memory 560 is part of, or on the same chip as, the processor 550.

The network interface controller 520 manages data exchanges via the network interface 525. The network interface controller 520 handles the physical, media access control, and data link layers of the Open Systems Interconnect (OSI) model for network communication. In some implementations, some of the network interface controller's tasks are handled by the processor 550. In some implementations, the network interface controller 520 is part of the processor 550. In some implementations, a computing system 510 has multiple network interface controllers 520. In some implementations, the network interface 525 is a connection point for a physical network link, e.g., an RJ 45 connector. In some implementations, the network interface controller 520 supports wireless network connections and an interface port 525 is a wireless Bluetooth transceiver. Generally, a computing system 510 exchanges data with other computing devices or network devices via physical or wireless links to a network interface 525. In some implementations, the network interface controller 520 implements a network protocol such as LTE, TCP/IP Ethernet, IEEE 802.11, IEEE 802.16, Bluetooth, or the like.

Other computing devices 530 can connected to the computing system 510 via a network interface port 525. The other computing device 530 can be a peer computing device, a network device, a server, or any other computing device with network functionality. For example, a computing device 530 can be a second controller of the actuator 110 (e.g., Act. Controller 340), a second inertial sensor 225, a second computing device, or a server. In some embodiments, the computing device 530 can be a network device such as a hub, a bridge, a switch, or a router, connecting the computing system 510 to a data network such as the Internet.

In some uses, the I/O interface 540 supports an input device and/or an output device (not shown). In some uses, the input device and the output device are integrated into the same hardware, e.g., as in a touch screen. In some uses, such as in a server context, there is no I/O interface 540 or the I/O interface 540 is not used. In some uses, additional other components 580 are in communication with the computer system 510, e.g., external devices connected via a universal serial bus (USB).

The other devices 580 can include an I/O interface 540, external serial device ports, and any additional co-processors. For example, a computing system 510 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 510, e.g., a touch screen on a tablet device. In some implementations, a computing device 510 includes an additional device 580 such as a co-processor, e.g., a math co-processor that can assist the processor 550 with high precision or complex calculations.

Exemplary technical effects of the systems, devices, and methods of valve control actuation via an inertial sensor described herein include, by way of non-limiting example, improved valve actuation and operation. By providing an inertial sensor coupled to an actuating valve component, the valve system described herein can include fewer mechanical linkages and can reduce the complexity of the valve actuation control system. This can reduce the need for complex inventories control system parts, assembly methods, and maintenance equipment. The improved valve actuation system described herein can further provide more accurate valve control by integrating acceleration, rotational speed, and temperature into a determined control signal as compared to existing control systems which may not include and account for temperature fluctuations in control signal provisioning. The improved valve actuation control systems, devices, and methods allow a valve to achieve a tighter operating parameters for valve opening or closing or adjustments. In addition, the valve actuation control system can be coupled to existing valves as a retrofit assembly enabling operators to easily update complex mechanical linkage control system for a more precise inertial valve control system with a reduced operating footprint.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A system comprising:
a valve comprising an inlet, an outlet, and a plug positioned between the inlet and the outlet, the plug coupled to a stem configured to translate or rotate in a first direction causing the plug to open the valve or to translate or rotate in a second direction opposite to the first direction causing the plug to close the valve;
an actuator coupled to the stem;
an inertial sensor coupled to the stem;
a temperature sensor coupled to the stem; and
a controller coupled to the inertial sensor, to the temperature sensor, and to the actuator, the controller comprising at least one data processor and a memory storing non-transitory, computer-readable instructions, which when executed by the at least one data processor cause the controller to:
receive first data characterizing motion of the stem from the inertial sensor;
receive second data characterizing a temperature of the stem from the temperature sensor;
correct the first data based on the second data; and
generate control signals provided to the actuator based on the corrected first data, the control signals causing the actuator to translate or rotate the stem in the first direction or the second direction.

2. The system of claim 1, wherein the actuator comprises a pneumatic actuator, a mechanical actuator, or an electric-drive actuator.

3. The system of claim 1, wherein the inertial sensor comprises at least one accelerometer and at least one gyroscope.

4. The system of claim 1, wherein the first data corresponds to translation or rotation of the stem in the first direction or the second direction and comprises velocity data, vibration data, packing friction data, and multi-axis position data.

5. The system of claim 4, wherein the multi-axis position data includes acceleration data and rotational speed data corresponding to the translation or rotation of the stem in the first direction or the second direction.

6. The system of claim 4, wherein the acceleration data and the rotational speed data are associated with translation or rotation of the stem along an X-axis, a Y-axis, and/or a Z-axis of the stem.

7. The system of claim 1, wherein the memory is configured to store one or more valve characteristics comprising a rotation zero value corresponding to a position of the stem.

8. The system of claim 7, wherein the controller is configured to generate the control signals based on comparing the first data to the rotation zero value.

9. The system of claim 1, further comprising a power supply coupled to the actuator and the inertial sensor.

10. A method comprising:
receiving, by at least one data processor of a controller, first data characterizing motion of a stem of a valve from an inertial sensor coupled to the stem, the valve comprising an inlet, an outlet, and a plug positioned between the inlet and the outlet, the stem configured to translate or rotate in a first direction causing the plug to open the valve or to translate or rotate in a second direction opposite to the first direction causing the plug to close the valve;
receiving, by the at least one data processor of the controller, second data characterizing a temperature of the stem from a temperature sensor coupled to the stem;
correcting, by the at least one data processor of the controller, the first data based on the second data;
determining, by the at least one data processor of the controller based on the corrected first data, at least one control signal configured to cause an actuator coupled to the stem to translate or rotate the stem in the first direction or the second direction;
providing, by the at least one data processor and based on the determining, the at least one the control signal to the actuator; and
opening or closing the valve based on the at least one control signal.

11. The method of claim 10, wherein the actuator comprises a pneumatic actuator, a mechanical actuator, or an electric-drive actuator.

12. The method of claim 10, wherein the inertial sensor comprises at least one accelerometer and at least one gyroscope.

13. The method of claim 10, wherein the first data corresponds to translation or rotation of the stem in the first direction or the second direction and comprises velocity data, vibration data, packing friction data, and multi-axis position data.

14. The method of claim 13, wherein the multi-axis position data includes acceleration data and rotational speed data corresponding to the translation or rotation of the stem in the first direction or the second direction.

15. The method of claim 13, wherein the acceleration data and the rotational speed data are associated with translation or rotation of the stem along an X-axis, a Y-axis, and/or a Z-axis of the stem.

16. The method of claim 10, wherein the controller further comprises a memory configured to store one or more valve characteristics comprising a rotation zero value corresponding to a position of the stem.

17. The method of claim 16, wherein the controller is configured to generate the at least one control signal based on comparing the first data to the rotation zero value.

18. The method of claim 10, wherein the actuator and the inertial sensor are coupled to a power supply.

* * * * *